Feb. 13, 1934.  W. G. BRETTELL  1,947,327
PRESERVATION OF FISH IN TRAWLERS OR MARINE CARRIERS
Filed Nov. 16, 1931  4 Sheets-Sheet 1
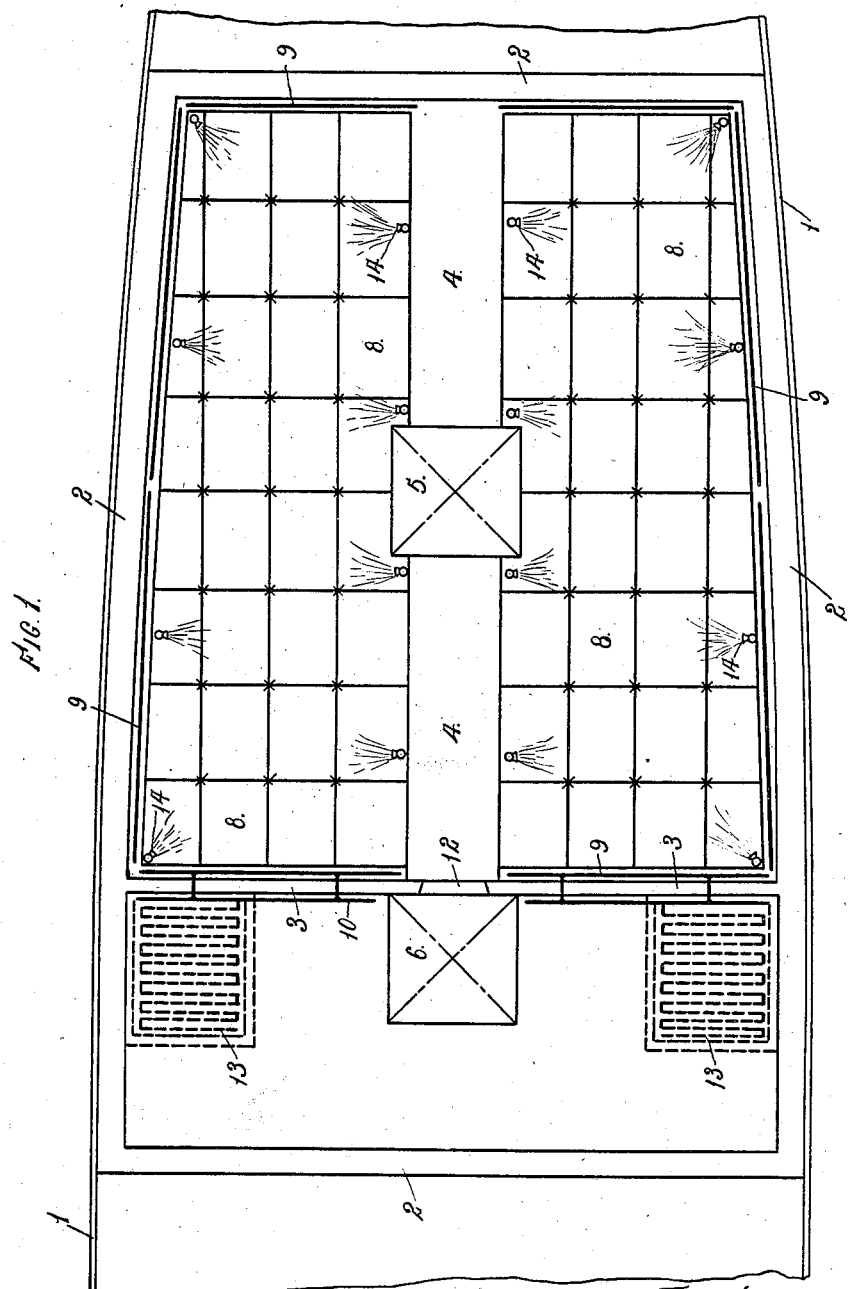

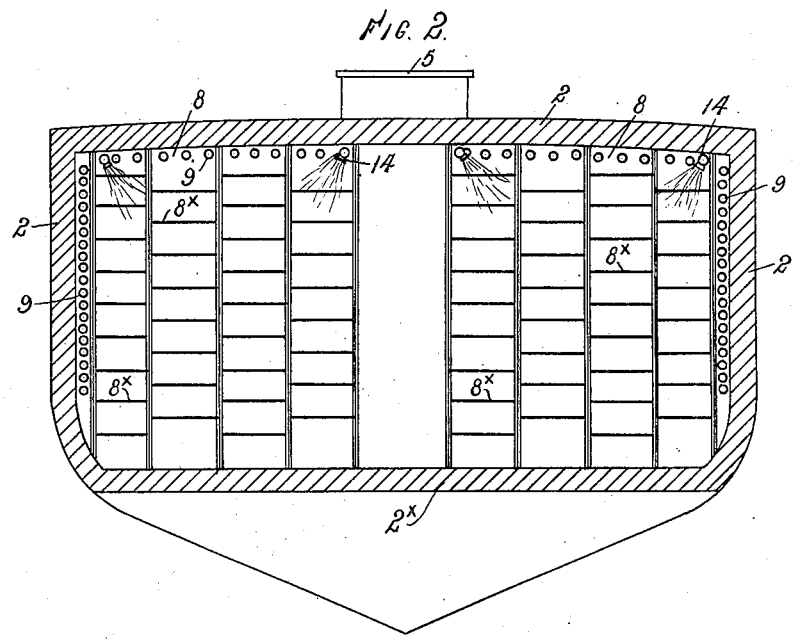
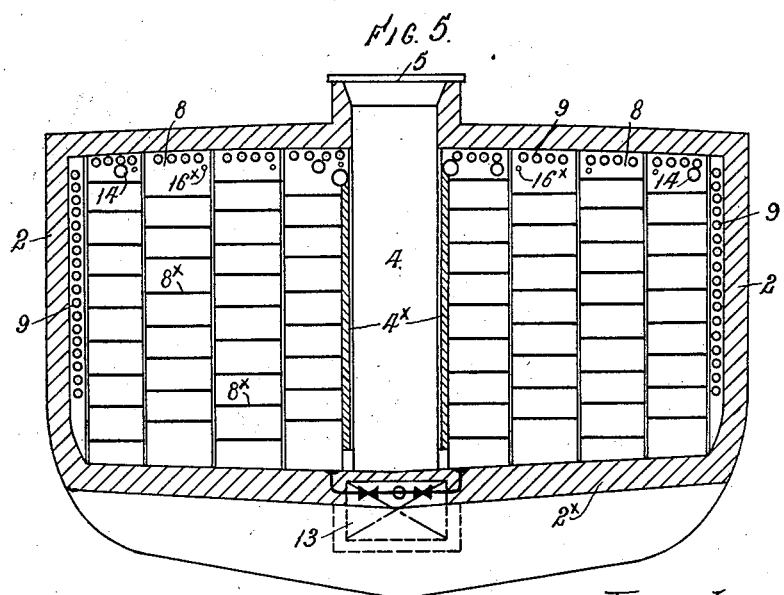

Feb. 13, 1934. W. G. BRETTELL 1,947,327
PRESERVATION OF FISH IN TRAWLERS OR MARINE CARRIERS
Filed Nov. 16, 1931 4 Sheets-Sheet 3
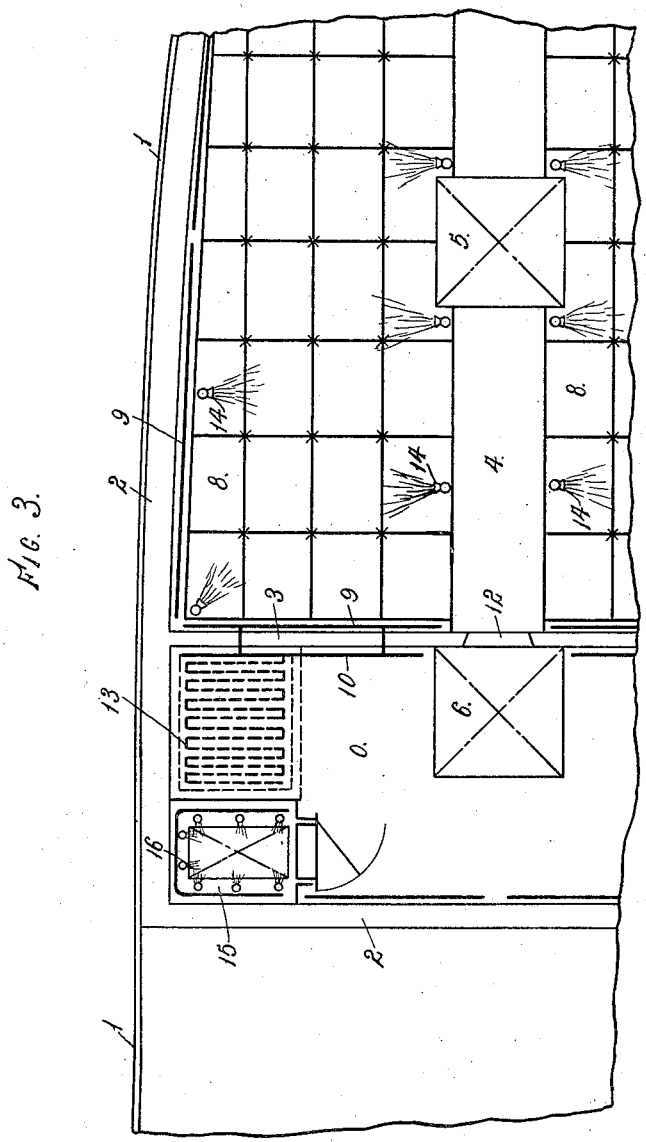

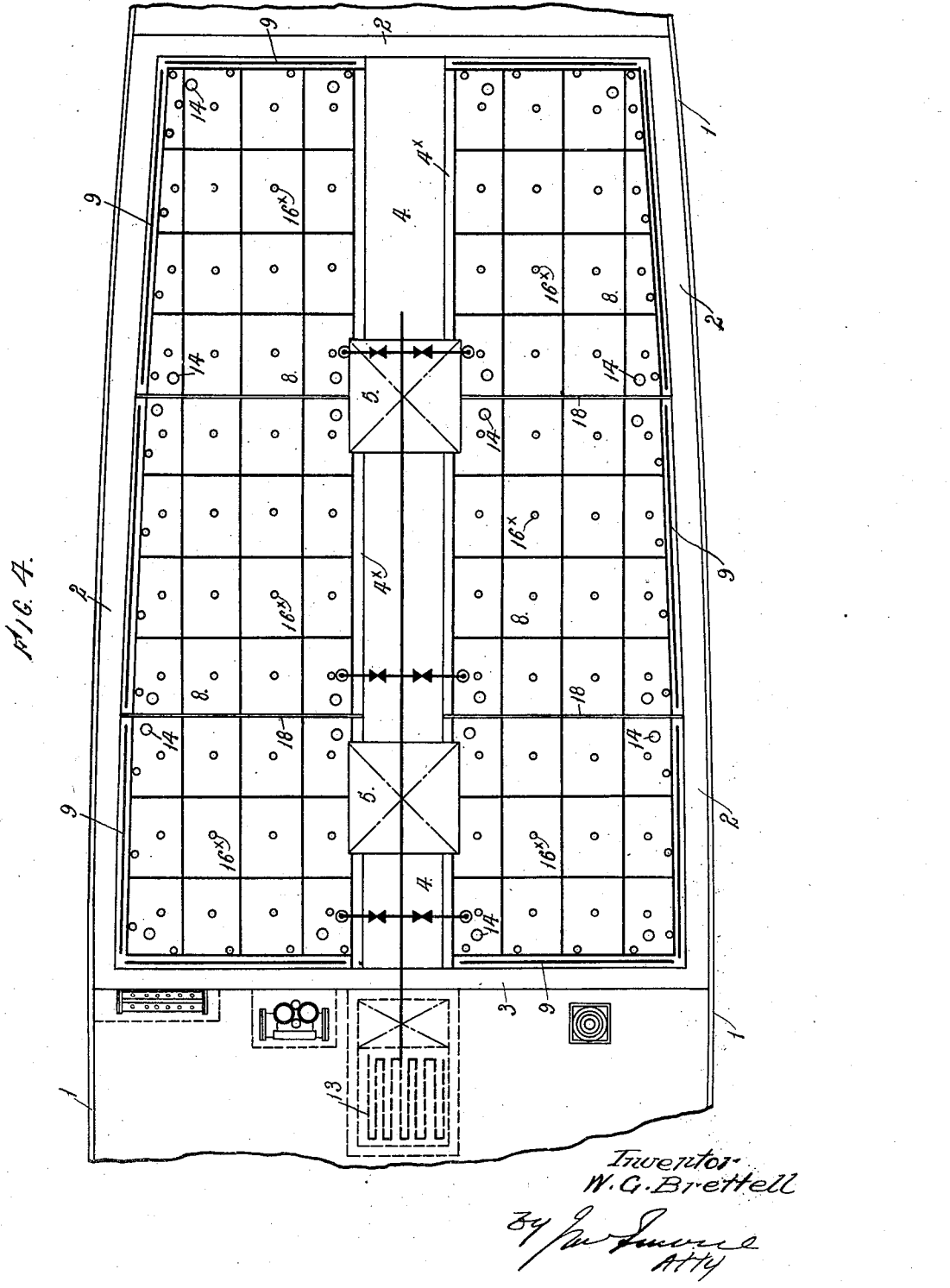

UNITED STATES PATENT OFFICE 1,947,327

PRESERVATION OF FISH IN TRAWLERS OR MARINE CARRIERS

William George Brettell, Liverpool, England

Application November 16, 1931, Serial No. 575,396, and in Great Britain November 17, 1930

1 Claim. (Cl. 62—104)

This invention has reference to the treatment and storing of fish, and more particularly in fishing vessels such as trawlers when at sea, or fish transports; and it has primarily for its objects and effects to provide improvements in connection with the treating and keeping of the fish up to the time of the discharge or unloading from the vessel with the object of preserving their quality, both as regards appearance and otherwise, so that they will be delivered to the port of discharge in as fresh and good condition as possible both exteriorly and interiorly, and thus be relatively more valuable.

It is well known that at present, fishing vessels very frequently have their fishing grounds a long distance away from the market, and they are often away from port for a long time, so that between the time of catching fish, especially the early part of it, to the time of discharge at the port, they will be in the vessel for a relatively long time, that is, several or many days, so that deterioration of their appearance and quality is liable to take place, and does, which it is the object of this invention to avoid.

Usually in such vessels the fish are gutted and cleaned and stored on shelves, trays or the like in holds or stores; and usually there is mixed with the fish or thrown on them, crushed ice, to keep them cool and fresh, i. e. with the object of maintaining them in a desired and proper condition, but the fish being in contact with the air in the hold or store of the vessel suffer and lose their fresh appearance and not only does their surface freshness deteriorate, but also to some extent the quality of the flesh.

According to this invention, after the fish have been gutted and cleaned, they are placed and kept for as long as required in the storage bins or receptacles in suitable trays, shelves or the like, and then they are subjected to a moist atmosphere; that is to say an atmosphere which is humidified, or saturated or super-saturated artificially with moisture; i. e. it is a thoroughly moist atmosphere, and will not take up or absorb any moisture from the fish, which are in contact with it, and being acted upon by it.

Preferably, the temperature of this atmosphere should be just above the freezing point of water, or about the freezing point; and this condition is maintained by the employment of cooling surfaces, say in the form of pipes in and next the walls or surfaces of the storing chamber, through which a cold fluid, such as an expanded gas or other cold fluid is circulated, and to which the gas is supplied from a refrigerative "evaporator"; and the moistness or humidity of the atmosphere is maintained by atomized liquid produced by liquid sprayers or atomizers, which in some cases are of the kind where the water is delivered under pressure, and is atomized by forcing it through the devices; or it may be effected by forcing air through a liquid atomising nozzle device, so that the spray ejected will be a mixture of air and very finely divided water, the water being preferably delivered at the low temperature referred to, or about it.

In some cases the fish are both chilled down to the required temperature in the storage chamber by a cold wet fog, and then the atmosphere kept in a saturated condition for as long as required; and this may be effected by the use of separate sets of nozzle devices, namely, some liquid atomizing nozzle devices for supplying cold atomized liquid for creating the low chilling temperature of the atmosphere in the holds and chilling the fish, and others for saturating or humidifying the air, of which a relatively few are required.

By this system, the required condition of the atmosphere as regards humidity, and the condition as regards temperature are provided.

According to a modified method of preserving and treating fish, in the holds of fishing vessels or others in which fish are conveyed, the actual chilling of the fish is effected in a chamber or chambers separate from the storage chambers or holds; and in this case the cleaned and gutted fish are introduced into a relatively small refrigerating chamber, and they are refrigerated therein to the required degree, preferably by the use of a wet cold fog, produced say by atomizers in the chamber, the wet fog in the containers containing free water in a fine atomized state. That is, the atmosphere contains the moisture in this state, and when the fish have been chilled, they are taken out of this preparatory chamber, and stored similarly as above described in the storage bins in the storage holds or chambers of the vessel in which the low temperature is required, and to which the fully saturated or humidified air is delivered and maintained, and also the temperature required maintained as described.

The humidity of the preserving atmosphere, and temperature, are thus retained.

In some cases the storage holds may be divided up by partitions, so that these holds provide a number of separate storage chambers, each of which will be provided with the nozzles for supplying a humidifying atmosphere, and a chilling atmosphere similarly; and in action or use, they would be separately filled and discharged, so that the packing and stowing, and discharging, would be done piece by piece in connection with each chamber, without disturbing or affecting the atmosphere and fish in the other chambers.

In some cases, below the level of the floors of these chambers, i. e. in the bottom of the boat, an evaporative cooler or the like is used, into which liquid which is deposited in and flowing away from the stowage chambers would pass, so that it would be cooled or refrigerated and re-delivered through the refrigerator atomizing nozzle device; or it may be both refrigerated and filtered by passing it through suitable filter on its return to the chambers.

By the use of the nozzle devices, the atmosphere in the hold or chambers will be caused to be fully circulated over the fish, at more or less high velocity; and thus the wet condition of the surface of the fish is always assured, as is also the maintenance of a uniform temperature.

By this humid condition of the atmosphere, the surface of the fish will not be dried at all, nor will the fish deteriorate in quality.

Whilst the process has been described as requiring no use of ice in contact with the fish, if desired a relatively small quantity of ice may be mixed with the fish in layers to separate them, and so promote the movement of the humidified air between them.

The drawings showing examples of the invention above generally described are annexed hereto, three modifications being illustrated.

Of the drawings, Figure 1 is a plan in diagram, and Figure 2 a cross section of a fish ship according to the invention. Figure 3 illustrates a modification of the apparatus or arrangement shown in Figures 1 and 2. And Figures 4 and 5 are plan and cross section showing another modification of the apparatus and arrangement shown in Figures 1 and 2.

Referring to the drawings, and more particularly to Figures 1 and 2 in the first instance, 1 represents the hull of the ship, 2 are the heat insulated walls of the hold or chambers connected with the refrigeration and keeping of the fish, there being two chambers separated by an insulated partition wall 3, the right hand one of which constitutes the preserving or treating chamber proper.

Within this chamber there are two sets of bins, one on each side, having a gangway 4 between them, with a central hatch 5; while another hatch 6 is provided in the deck above the left hand chamber.

As will be seen by the drawings, the storage chambers are divided up into a multiplicity of bins 8, and the fish to be stored are held on shelves or trays of any known suitable kind, which are placed in position in the bins one above the other in the known way.

The side and end walls, and roof of the storing chambers are furnished with pipe grids 9, in the usual way of cold storage chambers; and through them a chilling or refrigerating fluid, such for example as expanded ammonia, is passed, and supplied to them by pipes 10 outside the ante-chamber division wall 3, in which chamber the refrigerator unit or units 13 is or are placed, they being disposed underneath the insulated floor 2× of this chamber.

In the store chambers or holds there are distributed liquid spraying or atomizing nozzle devices 14, by the liquid of which the air is fully humidified or kept at a fully saturated or super- saturated state, so that the surface of the fish over which the streams of air from the nozzle devices flow are constantly kept in a wet condition, that is they are prevented from becoming at all dry, which, if allowed, causes deterioration in the fish, both as regards sight and condition. Also by these sprays being at a low temperature, the temperature of the hold or chambers will be maintained at a temperature slightly above freezing.

In some cases this atomized liquid, the particles of which are very fine, is produced by forcing under pressure the liquid—say brine—through nozzle devices of known kind; or it may be produced by forcing the liquid through atomizing nozzle devices by compressed air; the supply and atomizing being such that there is little or no actual free water carried by or physically combined with the air of the atmosphere in the chamber.

In this method of storage and treating fish, and arrangement of storage chambers, the fish after being gutted and cleaned, are placed on the shelves or trays 8× in the bins 8, in the known way; and when this is done and the door 12 of the storage chamber closed, they are subjected to the action of the circulating or moving saturated atmosphere, and in this condition the fish will be kept at the required temperature and condition.

In the system illustrated in Figure 3, the fish are refrigerated, that is reduced to a temperature slightly above or at freezing point, prior to being put in the store chamber, and then they are subsequently packed and stowed on the shelves 8× of the bins 8 of the store chamber. In this case a separate refrigeration chamber 15 is provided, and in it the fish are refrigerated in batches, and when the batch of fish is brought to the required chilled temperature, it is transferred into the storage chamber. The chilling cabinet or chamber 15 is disposed in the ante-chamber O to the main storage chamber.

The required humidity of the atmosphere in the storage chamber in this case shown in Figure 3, is maintained by atomized liquid by nozzle devices 14 similarly as in the case described with reference to Figures 1 and 2; and the walls of this chamber also will be furnished with pipe grids 9 at the sides, ends, and roof also similarly as in the arrangement described with reference to Figures 1 and 2.

The refrigerating of the fish in the refrigerating cabinet 15 may be advantageously rapidly effected by means of sprays or streams of atomized liquid such as brine, produced by atomizing jets or nozzle devices 16 in the chamber, by which a very wet cold dense fog is produced, in which the liquid or some of it will be in the condition of a dense "Scotch mist", i. e. free atomized particles of liquid exist in and are carried by the atmosphere in it; and these jets being in multiple suitably distributed over the walls of the cabinet, will produce a multiplicity of streams of fog atmosphere of any low degree of temperature, in various directions, and moving at a high velocity over and in contact with the fish, and they are thereby rapidly refrigerated down to the specified required temperature, and the retention of their original quality is thereby promoted. The pipe grids 9 in this case also are used in the chamber, and through them refrigerating fluid, such as evaporated ammonia or other refrigerating medium is supplied, in the known way.

With regard to the modified method of refrigerating and storing fish illustrated in Figures 4 and 5, the fish may be first rapidly chilled or reduced to the required "chilling" temperature in the hold by the method of chilling above specified in connection with the system described with reference to Figure 3; and in this case there are two sets of nozzles for supplying sprays of atomized liquid, such as brine, one set for supplying the atomized liquid fog sprays for rapidly refrigerating or chilling the fish down to the required temperature; and the other set for providing an atomized liquid for merely humidifying or saturating the atmosphere of the holds, and maintaining it in a saturated or slightly super-saturated condition, permanently.

The humidifying or air saturating atomizing nozzle devices are represented by the larger circles marked 14; while the atomizers for supplying the cold refrigerating atomized liquid or fog for rapidly chilling the fish, that is reducing its temperature from that at which they are introduced into the storing chambers or holds, to the low temperature just above or at freezing point, are marked $16^x$. In this system, the storage holds or chambers are in multiple, and separated from one another by thin partitions 18, which extend between the outside insulated side walls 2, the walls $4^x$ separating the alley way 4 from the chambers; and in working the ship, one of the storage chambers or holds will be charged with the required quantity of clean or prepared fish, and then the door in the wall 3 of this chamber is closed, and then the refrigerating sprays from the nozzles $16^x$ are put in action, and produce the cold wet atomized atmosphere above described; and when the temperature has been reduced, these atomizers 16 are put out of action, and the humidifying atomizers 14 are put in action; and by the atomized liquid discharged from them, the atmosphere is just kept at the required point of humidity or saturation required. In this system, the chambers or holds may be loaded, and the charges put under treatment in series in the manner described; and, conversely, unloaded in series.

The interior of the walls 2, of the storing chambers or holds, may be similarly provided with piping as above described, through which say a cold evaporated fluid from an evaporator is passed, by which the required chilling temperature of the hold is maintained; the refrigerator unit in this case being placed under the insulated floor $2^x$, as in the cases described with reference to Figures 1, 2 and 3.

In any of the modified systems above described, some ice may be spread amongst the fish carcasses, if so desired, which constitute a separating medium between them.

What is claimed is:—

In a fish vessel in which fish are stored and preserved, means comprising a plurality of heat insulated chambers having cooling surfaces within same for maintaining the atmosphere at the required low temperature; liquid atomizing nozzles for creating and supplying a cold wet fog within the chambers at a low temperature for reducing the temperature of the fish to that required; and a multiplicity of separate liquid atomizing nozzle devices for supplying atomized liquid to the atmosphere during the storing of the chilled fish for maintaining the atmosphere in a saturated or super-saturated condition.

WILLIAM GEORGE BRETTELL.